United States Patent
Disch et al.

(10) Patent No.: US 12,507,857 B2
(45) Date of Patent: Dec. 30, 2025

(54) SYSTEM FOR OPTICAL WASH ITEM RECOGNITION IN DISHWASHERS, METHOD FOR OPTICAL WASH ITEM RECOGNITION, DISHWASHER WITH AN OPTICAL WASH ITEM RECOGNITION SYSTEM AND METHOD FOR OPERATING SUCH A DISHWASHER

(71) Applicant: ILLINOIS TOOL WORKS INC., Glenview, IL (US)

(72) Inventors: Harald Disch, Elzach (DE); Björn S. Himmelsbach, Offenburg (DE); Sebastian Huber, Appenweier (DE); Patrick Dufner, Offenburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 328 days.

(21) Appl. No.: 17/608,868

(22) PCT Filed: Apr. 27, 2020

(86) PCT No.: PCT/US2020/030028
§ 371 (c)(1),
(2) Date: Nov. 4, 2021

(87) PCT Pub. No.: WO2020/226922
PCT Pub. Date: Nov. 12, 2020

(65) Prior Publication Data
US 2022/0273158 A1    Sep. 1, 2022

(30) Foreign Application Priority Data
May 7, 2019   (DE) ............... 10 2019 111 848.4

(51) Int. Cl.
*A47L 15/00*   (2006.01)
*A47L 15/42*   (2006.01)
*A47L 15/46*   (2006.01)

(52) U.S. Cl.
CPC ....... *A47L 15/0021* (2013.01); *A47L 15/4295* (2013.01); *A47L 15/46* (2013.01);
(Continued)

(58) Field of Classification Search
CPC ............ A47L 15/4295; A47L 15/0021; A47L 15/006; A47L 15/0081; A47L 15/24;
(Continued)

(56) References Cited

U.S. PATENT DOCUMENTS 4,070,204 A  *  1/1978  Hardy ................. A47L 15/4287
                                                                134/36
5,131,419 A  *  7/1992  Roberts ............... A47L 15/0078
                                                                134/113
(Continued)

FOREIGN PATENT DOCUMENTS

CN      101678134 A    3/2010
CN      203073905 U    7/2013
(Continued)

OTHER PUBLICATIONS

CN108852239A Written Description (Year: 2018).*
(Continued)

*Primary Examiner* — Kaj K Olsen
*Assistant Examiner* — Richard Z. Zhang
(74) *Attorney, Agent, or Firm* — THOMPSON HINE LLP

(57) ABSTRACT

A system for optical wash item recognition for commercial dishwashers embodied as conveyor dishwashers or as automatic programme dishwashers, in particular hood dishwashers, wherein the system includes an optical recognition system, especially a camera, for recording at least one
(Continued)

two-dimensional image of at least some of the wash items to be treated in the dishwasher. The system also includes an analysis device for analysing at least one recorded image in such a way that individual wash items or groups of individual wash items in the recorded image are located and classified. At least one neural network is used to analyse the at least one recorded image.

4 Claims, 2 Drawing Sheets

(52) U.S. Cl.
CPC ....... *A47L 15/0076* (2013.01); *A47L 15/0081* (2013.01); *A47L 2401/04* (2013.01); *A47L 2501/30* (2013.01)

(58) Field of Classification Search
CPC .. A47L 15/46; A47L 2401/04; A47L 15/0047; A47L 15/0076; A47L 2501/30; G06V 10/145; G06V 10/764; G06V 10/82
See application file for complete search history.

(56) References Cited

U.S. PATENT DOCUMENTS

| | | | | |
|---|---|---|---|---|
| 2006/0213543 | A1* | 9/2006 | Litterst | A47L 15/0047 134/103.2 |
| 2007/0295362 | A1* | 12/2007 | Doherty | A47L 15/247 134/25.2 |
| 2010/0282280 | A1* | 11/2010 | Usta Yogun | A47L 15/4295 134/56 D |
| 2011/0036382 | A1* | 2/2011 | Ertl | A47L 15/4217 134/172 |
| 2018/0036889 | A1 | 2/2018 | Birkmeyer | |
| 2019/0244375 | A1* | 8/2019 | Choi | G06T 7/0004 |
| 2020/0034688 | A1* | 1/2020 | Lim | G06N 3/08 |
| 2020/0281440 | A1* | 9/2020 | Disch | A47L 15/0047 |
| 2021/0127942 | A1* | 5/2021 | Terrádez Alemany | A47L 15/4295 |

FOREIGN PATENT DOCUMENTS

| | | | | |
|---|---|---|---|---|
| CN | 106466162 | A | | 3/2017 |
| CN | 106573581 | A | | 4/2017 |
| CN | 107485356 | A | | 12/2017 |
| CN | 108852239 | A * | 11/2018 | ............ A47L 15/46 |
| CN | 109657537 | A | | 4/2019 |
| CN | 109688312 | A | | 4/2019 |
| DE | 10048084 | A1 | | 4/2002 |
| DE | 102019108395 | A1 | | 10/2019 |
| EP | 1738677 | A2 | | 1/2007 |
| GB | 2572199 | A | | 9/2019 |
| JP | 2010131156 | A | | 6/2010 |
| KR | 10-2019-0019628 | A | | 2/2019 |
| WO | WO2013059141 | A2 * | 4/2013 | |
| WO | WO 2018044094 | A1 | | 3/2018 |

OTHER PUBLICATIONS

PCT, International Search Report and Written Opinion, International Application No. PCT/US2020/030028; date of mailing Jul. 12, 2020, 15 pages.

* cited by examiner

SYSTEM FOR OPTICAL WASH ITEM RECOGNITION IN DISHWASHERS, METHOD FOR OPTICAL WASH ITEM RECOGNITION, DISHWASHER WITH AN OPTICAL WASH ITEM RECOGNITION SYSTEM AND METHOD FOR OPERATING SUCH A DISHWASHER

TECHNICAL FIELD

The present invention generally concerns the field of commercial dishwashing.

According to one aspect, the invention relates in particular to a washer, in particular a dishwasher or a utensil washer, which is designed as a conveyor dishwasher or as a program automation dishwasher, such as a hood dishwasher, which has a treatment chamber that can be closed with a door or hood, in which in particular wash items accommodated in at least one wash basket can be treated according to a pre-selected or specified treatment program. The invention also concerns a method for operating such a washer.

According to a further aspect, the present invention concerns a system for optical wash item recognition in commercial washers in the form of conveyor dishwashers or in the form of program automation dishwashers, in particular hood dishwashers, as well as a method for optical wash item detection.

BACKGROUND

Program automation dishwashers within the meaning of the present invention are in particular manually loadable and unloadable dishwashers. The program automation dishwashers can be dish basket dishwashers with pass-through, also known as "hood dishwashers", or front loaders. Front loaders can be under-table machines, tabletop machines or free-standing washers with front loading.

Wash items are dishes, cups, pots, trays, cutlery, cutlery parts, glasses and kitchen utensils, for example.

Conveyor dishwashers within the meaning of the present invention are in particular belt conveyor dishwasher or basket conveyor dishwashers. Conveyor dishwashers are commonly used in commercial applications. In contrast to program automation dishwashers, in which the wash items to be cleaned remain stationary in the machine during cleaning, in conveyor dishwashers the wash items are transported through various treatment zones of the conveyor dishwasher.

A conveyor dishwasher usually has at least one pre-wash zone and at least one main wash zone, which is arranged after the pre-wash zone(s) when viewed in the wash item transport direction. Looking in the transport direction, at least one post-wash zone is usually arranged downstream of the main wash zone(s) and at least one final rinse zone, in particular a fresh water final rinse zone, is arranged downstream of the post-wash zone. Looking in the direction of transport, the wash items either directly accommodated on a conveyor belt or held by baskets usually pass in the transport direction through an inlet tunnel, the subsequent pre-wash zone(s), main wash zone(s), post-wash zone(s), final rinse zone(s) and a drying zone into an outlet section.

Said wash zones of the conveyor dishwasher are each assigned in a washing system, which has a washing pump and a pipe system connected to the washing pump, via which liquid is fed to the spray nozzles of the wash zone. The washing liquid supplied to the spray nozzles is sprayed onto the wash items in the respective wash zone, and the wash items are transported through the respective wash zones by a conveyor of the conveyor dishwasher. Each wash zone is assigned a tank in which sprayed liquid is accommodated and/or in which liquid is provided for the spray nozzles of the zone concerned.

In the conveyor dishwashers usually known from the prior art, final rinse liquid in the form of fresh water, which may be used in pure form or with other additives, such as rinse aid, is sprayed onto the wash items via the spray nozzles of the final rinse zone. At least some of the sprayed final rinse liquid is transported from zone to zone via a cascade system in the opposite direction to the wash item transport direction.

The sprayed final rinse liquid is collected in a tank (post-wash tank) of the post-wash zone, from which it is conveyed by means of the washing pump of the washing system belonging to the post-wash zone to the spray nozzles (post-wash nozzles) of the post-wash zone. In the post-wash zone, washing liquid is rinsed from the wash items. The resulting liquid flows into the washing tank of the at least one main wash zone, which is upstream of the post-wash zone looking in the wash item transport direction. Here, the liquid is usually provided with a cleanser and is sprayed onto wash items by a pump system (washing pump) belonging to the washing system of the main wash zone via the nozzles (washing nozzles) of the main wash zone. From the washing tank of the main wash zone, the liquid flows into the pre-wash zone, unless another main wash zone is provided. The liquid in the pre-washing tank is sprayed onto the wash items by means of a pump system belonging to the washing system of the pre-wash zone via the pre-washing nozzles of the pre-wash zone in order to remove coarse fouling from the wash items.

From document EP 1 738 677 A2, a household dishwasher is known which is designed for the following process sequence: a washing phase during which washing liquid from a sump is sprayed by means of a pump and spray nozzles into a treatment chamber, which is designed to accommodate wash items. After this, washing liquid is pumped out and the sump is filled with fresh water, which is then conveyed by the same pump as previously conveyed the washing liquid to the same spray nozzles to which the washing liquid was previously conveyed. In the transition from the sump to the pump there is a heater for heating the washing liquid, wherein during the final rinse phase the final rinse liquid can be heated or left unheated. After the final rinse phase, an evaporation phase follows, in which fresh water from the sump is evaporated by means of the heating and is fed into the treatment chamber via the aforementioned spray nozzles. After the evaporation phase, a drying phase can follow, during which the heated wash items dry.

Commercial dishwashers require water, cleanser, rinse aid and energy for cleaning wash items. The consumption of cleanser and rinse aid is proportionally dependent on the water consumption per washing cycle. At a constant water inlet temperature, this also applies to the heating temperature, which is required to heat the final rinse water.

A commercial dishwasher designed as a program automation dishwasher usually has two water circuits, which are completely separated from each other. These are a water circuit which is responsible for washing and which is implemented with used water from the washing tank, and a fresh water circuit which is responsible for final rinsing and which uses fresh water from a water heater.

The main task of the final rinse phase is to remove the residues of washing liquid (lye) located on the wash items. The final rinse liquid sprayed during the final rinse phase (pure fresh water or fresh water mixed with a rinse aid) flows into the washing tank and is therefore also used to regenerate the washing liquid. Before new final rinse liquid is fed into the washing tank during the final rinse phase, the same amount of washing liquid is pumped out of the washing tank.

In the case of washers which are designed in the form of a program automation dishwasher, the wash items to be treated, such as dishes, pots, glasses, cutlery and other utensils to be cleaned, are treated during several successively conducted treatment phases, such as washing phase (s), final rinse phase(s) and drying phase(s).

Different types of wash items, however, require different treatment parameters for the individual process steps due to their use, their degree of fouling, their shape and the material. In today's dishwashers, however, no automatic differentiation of the types of wash items to be treated is carried out, so that the conventional programs are often designed as a compromise, so that they can be used for several different types of wash items.

It is known that program automation dishwashers, such as under-table dishwashers or hood dishwashers, can be equipped with several treatment programs. The individual treatment programs differ mainly in the running time (cycle duration), the treatment phases or—in the case of special programs especially for the treatment of drinking glasses—in the temperature parameters of the washing phase and the final rinse phase.

With such program automation dishwashers, the operator has the option to choose a shorter program, for example in the case of slightly soiled wash items, such as drinking glasses, and a longer treatment program for more soiled or heavily soiled wash items.

In practice, however, the option of manual program selection is rarely used, especially due to insufficient training of the operating personnel, so that regardless of the type of wash items, a program that is set up in the factory is mainly used for the treatment of the wash items.

If a treatment program pre-set in the factory is used in the treatment of the wash items, which is usually designed as a compromise such that it can be used more or less efficiently for several types of wash items, for example slightly soiled items such as drinking glasses, are rinsed for uneconomically long times and at higher temperatures than would actually be necessary. On the other hand, there is a risk that, for example, wash items with more difficult to remove food residues, such as cooking utensils and/or cutlery, will not be cleaned sufficiently, so that several washing cycles or additional manual cleaning may be necessary.

The same problem occurs with conveyor dishwashers.

Regardless of whether the dishwasher is designed as a program automation dishwasher or as a conveyor dishwasher, dishwashers usually offer the operator the option to switch between different program sequences or program cycles. These are specially optimized for dedicated types of wash items. They differ in temperature, amount of final rinse water, water pressure, cycle time and the amount of chemicals used to minimize manual pre-treatment and post-treatment of the wash items outside the dishwasher.

However, it was found that in practice many operators do not actually make use of the option to manually adjust or change the treatment program depending on the type of wash items. This has the disadvantage that during the operation of the dishwasher it is often not possible to make efficient use of the resources (fresh water, chemicals and energy) or that good treatment results cannot be provided for all types of wash items. As a result, the wash items must be pre-treated and post-treated manually, which results in increased time in the scullery.

SUMMARY

Based on the above problem, therefore, it is the object of the invention to specify a solution with which optimal treatment results can be provided preferably automatically for all types of wash items to be treated in a dishwasher of the aforementioned type, while at the same time resources (fresh water, chemicals and energy) are used as efficiently as possible.

This object is achieved according to one aspect of the present invention by a system for optical wash item detection, in particular in commercial dishwashers designed as conveyor dishwashers or as program automation dishwashers, in particular hood dishwashers.

According to a further aspect, the object underlying the invention is achieved by a method for optical wash item detection, in particular in commercial dishwashers designed as conveyor dishwashers or as program automation dishwashers, in particular hood dishwashers.

According to a further aspect of the present invention, the underlying object is achieved by a washer, in particular a dishwasher or utensil washer, which is designed as a conveyor dishwasher or as a program automation dishwasher and which in particular has a treatment zone or a treatment chamber that can be closed with a door or hood, in which in particular wash items accommodated in at least one wash basket can be treated according to a pre-selected or predetermined treatment program.

According to a further aspect of the present invention, the underlying object is achieved by a method for operating a dishwasher of the aforementioned type.

Accordingly, according to the invention, in particular an optical wash item recognition system is specified for commercial dishwashers designed as conveyor dishwashers or as program automation dishwashers, in particular hood dishwashers, wherein the optical wash item recognition system has an optical recognition system, in particular with at least one camera, for recording at least one two-dimensional image, in particular with at least three color channels, of at least some of the wash items to be treated in the dishwasher. Furthermore, the optical wash item recognition system has an analysis device, which is designed such that at least one recorded image is evaluated in such a way that individual wash item parts or groups of individual wash item parts in the at least one recorded image are located and in particular classified. The wash item recognition system according to the invention is characterized in particular in that at least one neural network is used for the analysis of at least one recorded image.

By using at least one neural network to evaluate the recorded two-dimensional image, a particularly fast and accurate, but nevertheless storage space-sensitive object recognition system is feasible, wherein this system includes not only the recognition and classification of each object (wash item part) in an image, but also the localization of each individual object by drawing the corresponding bounding box.

According to preferred implementations of the optical wash item recognition system, the neural network is a CNN (CNN=Convolutional Neural Network), a YOLO network architecture or an SSD network architecture. Studies have shown that a YoloV3 network architecture, a TinyYoloV3 network architecture or a Sweaty network architecture is particularly suitable for object recognition and classification in dishwashers designed as program automation dishwashers, in particular hood dishwashers, although particularly good results could be achieved with a Single-Shot MultiBox detector (SSD) network architecture.

Similar to a YOLO network architecture, an SSD network architecture uses a single deep neural network for real-time object recognition. The difference with YOLO is the classification. SSD does not use fully-connected layers, but convolutional layers. At the beginning, the input image passes through a standard CNN, which is separated before the classification layer. For the actual detection, further convolutional layers follow with which feature maps with different resolutions m×n and p channels are generated.

During the analysis of the at least one image of the wash items to be classified in particular, systematic algorithms are used in order to synthesize an underlying relationship between data and information by means of a machine learning method. The characteristic of monitored machine learning, in particular, is to find a function that generalizes from a training experience and outputs a hypothesis about similar data. The crucial difference that separates machine learning from simple interpolation is this step of generalization.

A CNN network architecture is a deep learning architecture that has great potential in the localization and classification of wash item parts (objects) in images during optical wash item recognition in program automation dishwashers. Similar to regular artificial neural networks, CNN network architectures also consist of neurons with learnable weightings and biases. The difference is in the input. In CNN network architectures, these explicitly consist of images, which allows the architecture to be adjusted accordingly. The result is an increase in the efficiency of the feedforward pass and a reduction of the parameters in the network.

According to preferred embodiments of the wash item recognition system according to the invention, the neural network is an SSD network architecture, which consists of 7 layers and which is occasionally also referred to as a "SSD7 network architecture".

Unlike the original SSD network architecture, the SSD7 network architecture does not use a previous CNN. The design is implemented with only seven layers (seven convolutional layers).

The input image passes through these seven layers, wherein the last four layers generate so-called feature maps of different resolutions. These serve as input to the layers for detection. When the detections are generated, the characteristics from the four feature maps are classified and box coordinates are generated. The result is a number of detections, several per class with different confidence scores and box coordinates. Decoding is carried out, which, due to the number of detections, includes filtering of these. First, a so-called confidence threshold is used to filter out the classes that are above this threshold. Next a non-maximum suppression per class is carried out with an IoU threshold. The detected box with the highest confidence score is selected and all boxes around it that are too close to it measured at the IoU threshold are removed. A final threshold indicates how many remaining detections count towards the final detections. All the mentioned thresholds are determined experimentally using the monitored learning method.

With the method according to the invention for optical wash item recognition in, for example, commercial dishwashers designed as program automation dishwashers, in particular hood dishwashers, at least one two-dimensional image of at least some of the wash items to be treated in the dishwasher is initially recorded using an optical detection system. Subsequently, the at least one recorded image is analyzed using an analysis device in such a way that individual wash item parts or groups of individual wash item parts in the at least one recorded image are located and classified. As well as the wash item recognition system according to the invention, the method of optical wash item recognition is characterized in that at least one neural network is used for evaluating at least one recorded image, wherein this at least one neural network preferably consists of a single-shot multibox-detector network architecture, and in particular a single-shot multibox-detector network architecture which consists of 7 layers.

The washer according to the invention is in particular a crockery dishwasher or a utensil dishwasher, which is designed as a conveyor dishwasher or as a program automation dishwasher and has a treatment zone or a treatment chamber that can be closed with a door or hood, in which in particular wash items accommodated in at least one wash basket can be treated according to a pre-selected or specified treatment program. The dishwasher 1 according to the invention is characterized in that it has an optical wash item recognition system of the aforementioned type.

According to developments of the dishwasher according to the invention, it is provided that the optical recognition system is accommodated within the treatment zone/treatment chamber of the dishwasher. Alternatively, however, it is also conceivable that the optical recognition system is accommodated outside the treatment zone/treatment chamber and is arranged in such a way in relation to the treatment zone/treatment chamber that the optical recognition system is designed to record at least one two-dimensional image of at least some of the wash items to be treated when the wash items to be treated are accommodated in the treatment zone/treatment chamber in the dishwasher.

The optical recognition system is preferably assigned a lighting device arranged in particular within the treatment zone/treatment chamber of the dishwasher, which is designed to illuminate, at least in some areas, the wash items to be treated in the treatment zone/treatment chamber of the dishwasher, in particular during the image recording using the optical recognition system. Particularly good results with regard to the wash item classification are achievable if the lighting device is designed to illuminate the wash items to be treated in a particular homogeneous and diffuse manner, preferably with light at a color temperature between 5,000 and 5,700 K, in particular at a color temperature of about 5,100 K.

The dishwasher 1 according to the invention is characterized in particular in that it has a control device, in which are stored different treatment programs for the treatment of wash items in the treatment zone/treatment chamber of the dishwasher. These treatment programs differ in at least one treatment program, such as a time duration of a washing phase, a time duration of a final rinse phase, a time duration of a drying phase, a temperature of a washing liquid to be sprayed in the treatment zone/treatment chamber of the dishwasher during the washing phase, a temperature of a final rinse liquid to be sprayed in the treatment zone/treatment chamber of the dishwasher during the final rinse phase, a nozzle pressure of the washing liquid to be sprayed in the treatment zone/treatment chamber during the washing phase, a nozzle pressure of the final rinse liquid to be sprayed in the treatment zone/treatment chamber during the final rinse phase, an amount of washing liquid to be sprayed per unit time in the treatment zone/treatment chamber during the washing phase and/or an amount of final rinse liquid per unit time to be sprayed in the treatment zone/treatment chamber during the final rinse phase.

According to advantageous embodiments, the control device is in particular designed to select and suitably adjust a treatment program or individual treatment parameters for the treatment of the wash items, preferably automatically and even more preferably optionally automatically depending on the classified wash item parts.

The method according to the invention for operating a dishwasher in particular includes the step of classifying the wash item parts to be treated by means of an optical wash item recognition system and the step of treating the wash items in the treatment zone/treatment chamber of the dishwasher using treatment parameters which were preferably automatically selected depending on the classification of the wash item parts.

The optical wash item recognition system, which is used with the method according to the invention for operating a dishwasher for the purpose of classifying the wash item parts to be treated, is in particular an optical wash item recognition system of the aforementioned type according to the invention.

According to preferred implementations of the operating method according to the invention, it is provided that before classifying the wash item parts to be treated, the wash item parts—preferably accommodated in a wash basket—are placed in the treatment zone/treatment chamber of the dishwasher and the treatment zone/treatment chamber of the dishwasher is closed with the door or hood.

In order to prevent condensation of water vapor, in particular on a lens of the optical wash item recognition system, or to reduce the degree of condensation of water vapor, it is provided according to one development that a suitable measure is taken after the wash item parts have been placed in the treatment zone/treatment chamber of the dishwasher and the treatment zone/treatment chamber has been closed using the door or hood. This can be, for example, pre-washing of the wash items, in which liquid is sprayed in the treatment zone/treatment chamber, wherein this liquid is preferably not heated. Studies have shown that the water vapor condensation can be effectively reduced, in particular on the lens of the optical wash item recognition system, if the pre-washing lasts 10 seconds, preferably 5 seconds and especially preferably 0.5 to 2 seconds.

BRIEF DESCRIPTION OF THE DRAWINGS

The invention is described in more detail below on the basis of exemplary embodiments with reference to the drawings.

In the figures.

DETAILED DESCRIPTION

Figure 1:
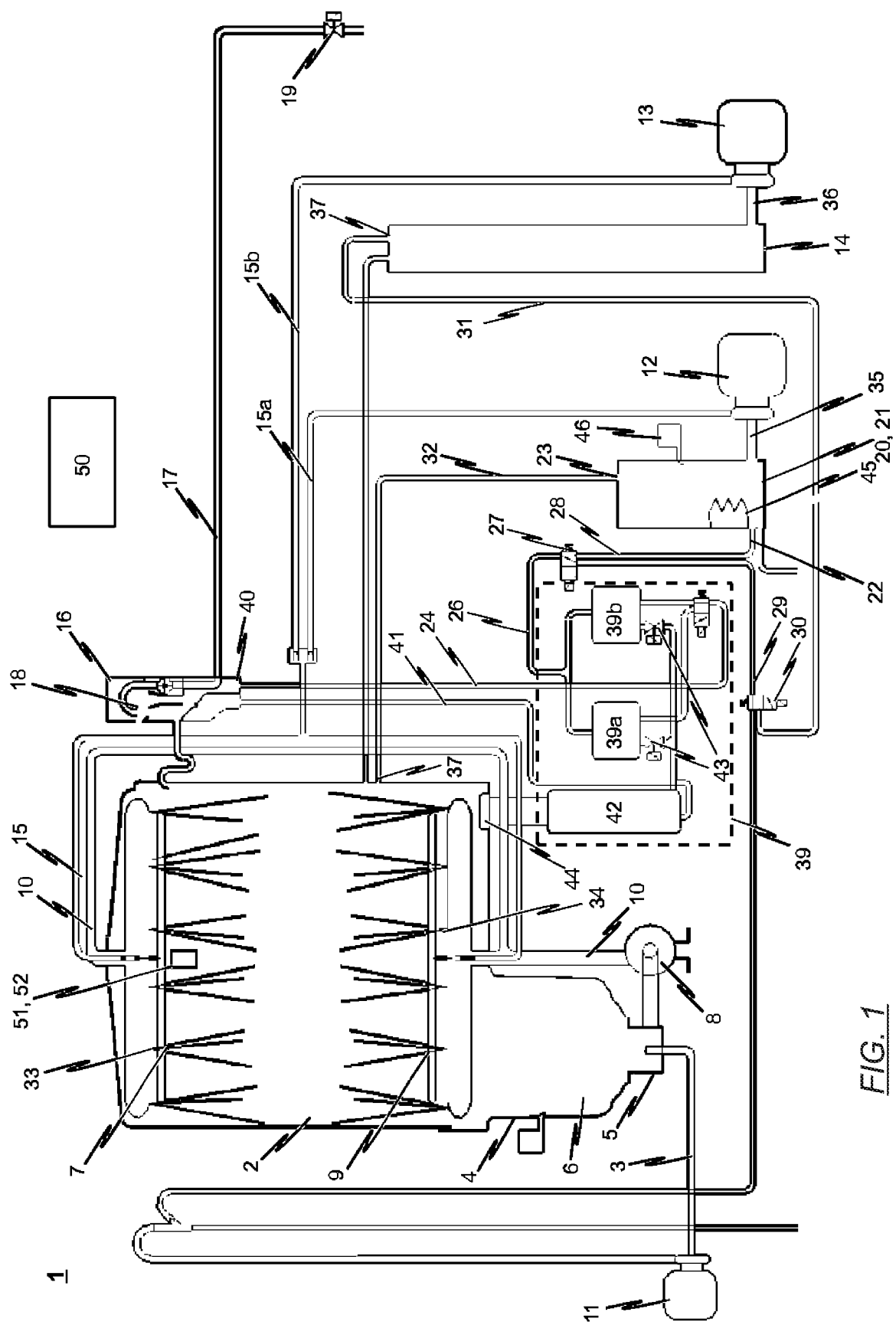
FIG. 1 shows schematically a dishwasher in the form of a program automation dishwasher according to a first embodiment of the invention.

The dishwashers 1 shown schematically in the drawings are designed in particular as hood dishwashers. Hood dishwashers can be found in sculleries, for example, of hotels, restaurants and cafés. In the case of hood dishwashers, the wash items are sorted into wash baskets, which are then pushed into the dishwasher. The washing and rinsing cycle starts by closing the hood.

Often a hood dishwasher has two tables on the left and right sides. These are used for the pre-treatment of soiled wash items as well as for sorting and buffering clean wash items. Pre-treatment is one of the most time-consuming processes in sculleries. Very soiled wash items are pre-treated in a basin next to the dishwasher. Soiling can be, for example, dried food residues or burnt-in deposits in pots and pans.

After soaking, the wash items are typically additionally washed by hand before being placed in wash baskets and washed in the dishwasher.

Another time-consuming step is post-treatment. If the washing, final rinse and drying results do not meet customer expectations (e.g. due to soiling or stains on the wash items), a second wash or manual polishing is required.

The dishwasher offers the operator the possibility to switch between several rinsing programs or treatment programs. These are specially optimized for specific types of wash items (temperature, amount of rinsing water, cycle time, etc.) to minimize pre-treatment and post-treatment.

Based on the fact that many operators never change the treatment program, the object is to replace manual program selection with automatic selection of the wash program. To do this, the dishwasher must be able to detect different types of wash items (e.g. glass, cutlery, GN containers, etc.). The operator of the dishwasher no longer has to select the treatment program manually. Instead, the dishwasher can automatically select the appropriate treatment program with the corresponding treatment parameter to improve washing, final rinse and drying results. As a result, the dishwasher operator has no or fewer secondary runs to handle, which would have been caused by choosing the wrong treatment program.

For this purpose, optical wash item recognition is specified according to the invention, wherein the wash item recognition is carried out using neural networks. According to preferred implementations, an adapted SSD network architecture evaluated in the course of an investigation is used, which is characterized in terms of its accuracy on the one hand, the necessary calculation effort on the other hand and also by the required storage capacity.

Before an exemplary embodiment of the wash item recognition system according to the invention is described in more detail, dishwashers for which the wash item recognition system is optimally suited should first be described with reference to the representations in FIGS. 1 and 2.

The dishwasher 1 according to the invention has a treatment chamber 2 for cleaning wash items that are not shown in the drawings. A washing tank 4 is arranged under the treatment chamber 2, into which liquid from the cleaning chamber 2 can flow back by gravity. The washing tank 4 can be covered at the transition to the treatment chamber 2 using a sieve that is not shown in the drawings. Washing liquid 6, which is usually water, is located in the washing tank 4, wherein if necessary a cleanser can be automatically supplied thereto in a controlled manner by a cleanser dosing device that not shown in the drawings. The washing liquid 6 can be conveyed by a washing pump 8 via a washing pipe system 10 to washing nozzles 33 and 34 and sprayed onto the wash items by the washing nozzles 33, 34 in the treatment chamber 2. The sprayed washing liquid 6 then flows back into the washing tank 4. A drain 3 with a drain pump 11 can be connected at the lower end 5 of the washing tank 4 to empty the washing tank 4 as required.

With the embodiment of the dishwasher 1 according to the invention shown in FIG. 1, a first final rinse pump 12 is connected with its suction side to an outlet 35 of a boiler 21.

The boiler 21 also has an inlet 22 connected to a fresh water supply pipe 28, by means of which the boiler 21 is supplied either with fresh water or with fresh water with added rinse aid. In the boiler 21, the liquid supplied via the inlet 22 (pure fresh water or fresh water with added rinse aid) is heated according to the specification of a process sequence. The final rinse liquid heated in the boiler 21 can be fed, for example during a fresh water rinse phase, via a final rinse pipe system 15, 15*a* to final rinse nozzles 7 or 9 via the first final rinse pump 12 connected with its suction side to the boiler outlet 35. The final rinse nozzles 7 and 9 are arranged in the treatment chamber 2 to spray the final rinse liquid heated in the boiler 21 onto to the wash items in the treatment chamber 2. Of course, however, it is also conceivable that pure fresh water is fed to the boiler 21 via the inlet 22 and the fresh water supply pipe 28, wherein rinse aid is fed into the fresh water using a rinse aid dosing device that is not shown in the drawings after heating in the boiler 21.

With the embodiment of the dishwasher 1 according to the invention shown in FIG. 1, a second final rinse pump 13 is further provided which is connected with its suction side to a fresh water tank 14 and with its pressure side to a final rinse pipe system 15, 15*b*. The final rinse pipe system 15*b* extending from the pressure side of the second final rinse pump 13 and the final rinse pipe system 15*a* extending from the pressure side of the first final rinse pump 12 transition into a common rinse pipe system 15. With the second final rinse pump 13 connected to the fresh water tank 14, unheated final rinse liquid can be conveyed to the final rinse nozzles 7 or 9 arranged in the treatment chamber 2 in order to spray unheated final rinse liquid onto the wash items as required.

The fresh water tank 14 has an inlet 37, which is connected to a fresh water supply pipe 31. The fresh water tank 14 is fed either pure fresh water or fresh water with added rinse aid via this fresh water supply pipe 31.

Of course, it is also conceivable to arrange the already mentioned rinse aid dosing device that is not explicitly shown in the drawings downstream of the outlet 36 of the fresh water tank 14.

The washing nozzles 33, 34 and the final rinse nozzles 7, 9 are each preferably arranged above and below the wash item area and directed towards the wash item area of the treatment chamber 2. With the embodiment of the dishwasher 1 according to the invention represented in FIG. 1, an upper washing nozzle system and an upper final rinse nozzle system implemented separately therefrom are provided as well as a lower washing nozzle system and a lower final rinse nozzle system implemented separately therefrom. Of course, it would also be conceivable to provide an upper and a lower washing nozzle system, which can be used for spraying both washing liquid and final rinse liquid. Also, the washing nozzles 33, 34 and/or the final rinse nozzles 7, 9 may be arranged only above or only below instead of below and above, or instead or additionally may even be arranged on one side of the treatment chamber 2 and oriented transversely to the treatment chamber 2 in the wash item area.

With the embodiment of the dishwasher 1 according to the invention illustrated in FIG. 1, both the boiler 21 and the fresh water tank 14 are connected via fresh water supply pipes 24, 26, 28,29 and 31 to a backflow preventer 16. The backflow preventer 16 serves to prevent fresh water from the suction side of the first final rinse pump 12 and/or the suction side of the second final rinse pump 13 from being sucked back into a fresh water supply pipe 17.

The backflow preventer 16 has an outlet 40, which is connected via fresh water supply pipes 24 and 41 to a water softener device 39. The water softener device 39 has on the one hand a salt tank 42 connected to the fresh water supply pipe 41, and on the other hand mutually parallel first and second water softeners 39*a*, 39*b*. The two mutually parallel water softeners 39*a*, 39*b* are connected via a corresponding fresh water pipe system and the fresh water supply pipe 24 to the outlet 40 of the backflow preventer 16. The water softeners 39*a*, 39*b* of the water softener device 39 can be operated alternately by appropriate control of valves 43 in order to soften the fresh water supplied to the boiler 21 via the fresh water supply pipes 26 and 28 and the fresh water supplied to the fresh water tank 14 via the fresh water supply pipes 26, 29 and 31.

A suitable salt or a suitable chemical may be contained in the salt tank 42 belonging to the water softener device 39. The salt or chemical is used to regenerate a water softener material added to the fresh water or a decay product resulting after the addition as required. The salt container 42 can be refilled with the salt or the chemical from the treatment chamber 2 of the dishwasher 1 via an opening that can be closed by a cover 44.

With the preferred embodiment of the dishwasher 1 according to the invention presented, the boiler 21 has an integrated steam generator 20. A corresponding steam outlet 23 of the steam generator 20 is formed at the upper part of the boiler 21. The steam outlet 23 of the steam generator 20 is connected to the treatment chamber 2 via a steam pipe 32 at a point above the washing tank 4 in order to introduce therein as required the steam produced in the steam generator 20. The outlet opening of the steam pipe 32 is preferably located between the upper nozzles 7, 33 and the lower nozzles 9,34 of the washing pipe system 10 or of the final rinse pipe system 15. Of course, other positions are also possible.

In the boiler 21, which serves not only for heating the final rinse liquid, but also for generating steam, there is a heater 45. Furthermore, a level sensor 46 may be arranged in or on the boiler, which controls a valve 19 of the fresh water pipe 17, for example.

In the preferred embodiment of the dishwasher 1 according to the invention shown in FIG. 1, it is optionally possible by providing the fresh water tank 14 and the second final rinse pump 13 to also supply unheated final rinse liquid via the final rinse pipe system 15*b* and 15 and the final rinse nozzles 7 or 9. Accordingly, it is possible to supply the treatment chamber 2 optionally with unheated or heated final rinse liquid by suitable control of the final rinse pumps 12, 13 and/or by suitable control, for example, of the valves 19, 27 and 30 arranged in the fresh water supply pipes to the fresh water tank 14 and the boiler 21.

A program control device 50 shown only schematically in the drawings is used to control at least one cleaning program and is designed and connected to the controllable components of the dishwasher 1, such as to the valves 19, 27 and 30, to the washing pump 8, to the first final rinse pump 12, to the second final rinse pump 13, and/or to a (not explicitly shown) heating control circuit for the control of the heating 45 so as to implement a cleaning process (cleaning cycle) with the following successive steps (phases):

1. a washing phase, in which washing liquid 6 from the washing tank 4 is sprayed by means of the washing pump 8 through the washing pipe system 10 into the treatment chamber 2 and can then flow back from the treatment chamber 2 into the washing tank 4 by gravity;
2. a fresh water final rinse phase, in which heated or unheated fresh water or fresh water with added rinse aid as a final rinse liquid is sprayed into the treatment chamber 2 by means of the first final rinse pump 12 or the second final rinse pump 13 and then can flow from the treatment chamber 2 into the washing tank 4 by gravity; and 3. (optional) a drying phase in which drying air circulates within the treatment chamber 2.

In a preferred implementation of the program control device 50, this is designed in such a way that, depending on the detected type of wash items, it automatically controls the controllable components of the dishwasher 1 in such a way that a steam final rinse phase is carried out after the fresh water final rinse phase, in which steam is generated by means of the steam generator 20 connected to the fresh water supply pipe 28 and is fed into the treatment chamber 2.

The dishwasher 1 according to the invention, as shown in FIG. 1 for example, is characterized inter alia in that an optical recognition system 51 that is only indicated schematically in the drawings is provided, which is used to detect the type of wash items accommodated in the treatment chamber 2, in particular by means of at least one camera. The recognition system 51 is preferably arranged inside or outside the treatment chamber 2 so that either the wash items accommodated in the treatment chamber 2 or a wash basket inserted into the treatment chamber 2 is in the detection area thereof.

As already mentioned, with the dishwasher 1 according to the present invention, the program control device 50 only schematically shown in the drawings is also provided. According to the invention, the program control device 50 is designed to control different controllable components of the dishwasher 1, such as the respective pumps and valves, according to a predetermined or predeterminable program sequence, in order to be able to set suitable process parameters during the individual treatment phases (washing phase, final rinse phase and drying phase). The program control device 50 is connected in particular via a suitable communication connection to an analysis device 52 of the recognition system 51 in order to be able to call up, continuously or at predetermined times or events, preferably before the beginning of the washing cycle, the type (classification) of the wash items accommodated in the treatment chamber 2 of the dishwasher 1 determined by the analysis device 52 on the basis of the image taken by the recognition system 51.

The analysis device 52 is designed to automatically recognize the wash item type/classification of the wash items to be treated on the basis of the image taken by the recognition system 51. Preferably, the analysis device 52 can automatically recognize at least the following wash items:

plates made of porcelain or a porcelain-like material;
cups made of porcelain or a porcelain-like material, glass or a glass-like material;
bowls made of porcelain or a porcelain-like material, glass or a glass-like material;
trays or tray-like objects made of a plastic material;
containers made of a metal, in particular stainless steel containers, in particular GN containers;
pots made of a metal, in particular stainless steel pots;
pans made of a metal, in particular stainless steel pans;
cutlery and cutlery parts made of a metal, in particular stainless steel cutlery and cutlery parts; and
drinking glasses made of glass or a glass-like material.

In the event that the analysis device 52 cannot determine the wash item type/classification on the basis of the image taken by the recognition system 51, the wash items in question will be identified as "other wash items".

The solution according to the invention is characterized not only on the one hand by the automatic detection of the type/classification of the wash items to be treated and on the other hand by the automatic recognition of the wash items to be treated, but also by the additional functionality of the program control device 50, according to which this is designed to automatically select a predetermined or predeterminable treatment program depending on the recorded wash item type, according to which the wash items accommodated in the treatment chamber 2 are to be treated during at least one treatment phase, and to adjust the process parameters of the selected treatment program by suitable control of the controllable components of the dishwasher 1. For this purpose, it is generally conceivable that the program control device 50, for example, has a memory device not explicitly shown in FIG. 1 which the program control device 50 can access. Optimally adapted treatment programs or corresponding process parameters for the operation of the dishwasher 1 for the individual types of wash items in question are stored in this memory device.

The invention is based inter alia on the knowledge that the optimal process parameters for the individual treatment phases depend on the type of wash items to be treated. The different types of wash items require suitable treatment programs according to which the wash items are to be treated, for example during the washing phase, the fresh water final rinse phase and/or the drying phase. For example, during the washing phase in which the washing liquid is sprayed, only slightly soiled dishes, such as drinking glasses, require only a relatively small amount of washing liquid injected per unit of time and only a relatively low nozzle pressure, in contrast to heavily soiled dishes with burnt-in and difficult to remove food residues, such as cooking utensils, warming containers, baking trays, etc. Furthermore, compared to heavily soiled dishes, only a shorter cycle duration of the washing phase is required for lightly soiled dishes.

On the other hand, the different types of wash items also require matching treatment programs for the fresh water final rinse phase following the washing phase. Also an adjustment of the process parameters that is carried out with regard to the type of wash items is also conceivable for the steam rinse phase and drying phase to be carried out after the fresh water rinse phase.

In this way, "overtreatment" can be effectively prevented in a simple but effective way, especially of only slightly soiled dishes, such as drinking glasses, so that no more resources of energy, water, chemicals etc. are used than necessary during the cleaning process (and possibly during the drying process) of such only slightly soiled dishes.

Also, the consumption of fresh water can be reduced which is sprayed onto the wash items, for example during the fresh water final rinse phase, in pure form or with further additives added. Due to the reduced fresh water consumption of the dishwasher 1, the consumption of chemicals, in particular rinse aids and/or cleansers can be reduced, without causing a change in the chemical concentration in the respective liquid (washing liquid, final rinse liquid). Due to a reduced water supply, the amount of water to be heated is reduced, which saves energy.

The invention is based inter alia on the knowledge that in conventional dishwashers, with washing and final rinse cycles running according to a factory preset program, overtreatment of the dishwasher often takes place. It is often sufficient for an adequate washing and rinsing result, for example, to have a shorter cycle duration of the washing phase, a smaller amount of washing liquid, which is injected per unit of time during the washing phase, a lower nozzle pressure, with which the washing liquid is injected during the washing phase, a smaller amount of final rinse liquid, which is sprayed overall during the fresh water final rinse phase, and/or a lower temperature of the liquid (washing liquid, final rinse liquid) to be sprayed during the washing phase and the fresh water final rinse phase.

According to the invention, the program control device 50 is therefore designed in such a way that, depending on the determined wash item type/classification, it automatically controls the washing pump 8 in such a way that at least one of the parameters specified below is adapted to the detected wash item type for the washing phase:

the cycle duration of the washing phase;
the amount of washing liquid injected per unit of time during the washing phase; and
the pressure with which the washing liquid is injected during the washing phase.

Figure 2:
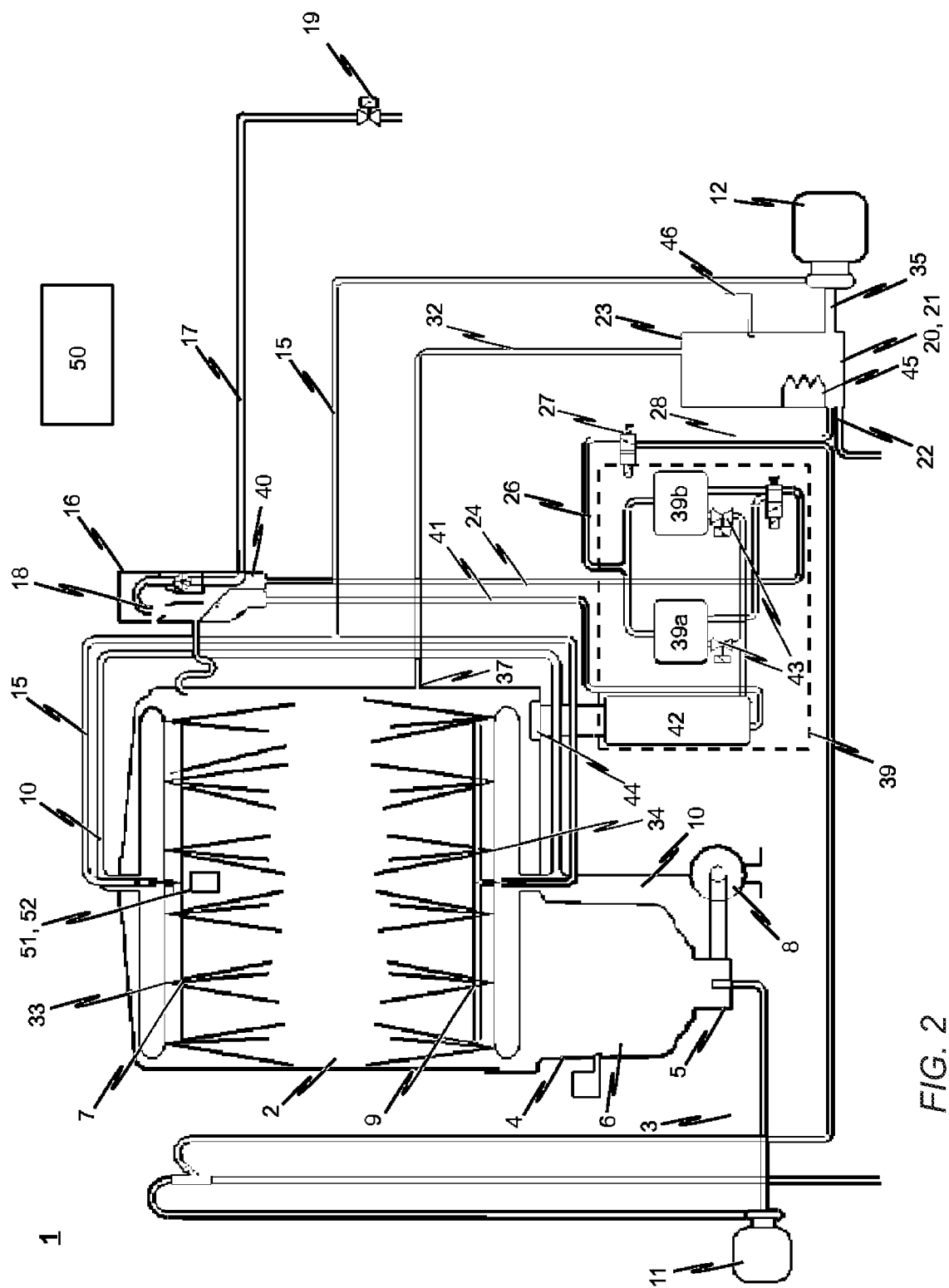
FIG. 2 shows schematically a dishwasher in the form of a program automation dishwasher according to a second embodiment of the invention.

In FIG. 2 a dishwasher 1, in particular a commercial dishwasher, in the form of a program automation dishwasher according to the second preferred embodiment of the solution according to the invention, is envisaged schematically. Unlike the first embodiment shown in FIG. 1, the dishwasher 1 shown in FIG. 2 has no fresh water tank and therefore no second final rinse pump, by means of which—as shown in FIG. 1—unheated final rinse liquid can be fed to the final rinse nozzles via a rinse pipe system. Otherwise, the dishwasher 1 shown in FIG. 2 is identical in structural and functional respects with the dishwasher previously described with reference to FIG. 1. Of course, it is conceivable that the (not explicitly shown) heating control circuit can control the heating 45 of the boiler 21 or the steam generator 20 accordingly to provide more or less heated final rinse liquid.

As already indicated, the schematically presented dishwashers 1 shown in FIG. 1 and FIG. 2 are each equipped with a wash item recognition system, which has an optical recognition system 51, in particular in the form of a camera, for recording at least one two-dimensional image of at least some of the wash items to be treated in the dishwasher 1.

Moreover, the wash item recognition system has the already briefly mentioned analysis device 52 for analyzing the at least one recorded image in such a way that individual wash item parts or groups of individual wash item parts in the recorded image are located and classified. In particular, a single-shot MultiBox detector network architecture is used as a neural network during the analysis of the at least one recorded image.

During wash item recognition, it is provided in particular that the at least one two-dimensional image is recorded of the wash items to be treated in the dishwasher 1 in the treatment chamber 2 of the dishwasher 1 with the optical recognition system 51, preferably in a condition in which the treatment chamber 2 is suitably closed.

For this purpose, the optical recognition system 51 (camera) is assigned a lighting device also preferably arranged within the treatment chamber 2, in particular to illuminate at least some areas of the wash items accommodated in the treatment chamber 2 of the dishwasher 1 during image recording using the optical recognition system 51. The illumination is carried out, for example, by means of LED strips mounted on the sides or on the ceiling of the treatment chamber 2. In this way, particularly homogeneous and diffuse illumination of the wash items can be achieved. As a color temperature for illumination/lighting of the wash items, preferably a color temperature between 5,000 to 5,700 K and in particular a color temperature of about 5,100 K is used, since with a conventional camera as an optical recognition system, the best images can be recorded at this color temperature for subsequent processing with regard to the accuracy of the subsequent classification.

Preferably, in the dishwashers 1 shown in the drawings it is further provided that the image recording is carried out only after a (short) pre-wash of the wash items with liquid, which is preferably not heated, in order in this way to reduce or avoid water vapor condensation on the optical recognition system 51 or a lens of the camera.

Studies have shown that water vapor condensation can be sufficiently minimized even with a pre-wash of 0.5 to 2 seconds.

In short, the present invention is based on the knowledge that a neural network is surprisingly excellently suitable for the localization and classification of wash items sorted into wash baskets within a treatment chamber 2 of a dishwasher 1, in particular a hood dishwasher. The neural network is preferably a simplified single-shot MultiBox detector network architecture, which consists of 7 layers and is therefore sometimes referred to as "SSD7".

For training the SSD7 network, between 500 and 2,500 images were recorded during investigations. These show wash baskets laden with crockery (different combinations of pots, pans, GN containers, cutlery, plates, bowls, cups, glasses and plastic containers). The analysis of the SSD7 network was carried out with a separate image data set consisting of 70 images, which was not used for the training. The wash baskets in the pictures were populated with dishes, which were not used for the training of the SSD7 net (for example, bowls and glasses with different shapes). This measure was intended to determine how well the network generalizes the training images.

It was able to be shown that with the SSD7 network optical crockery recognition in the form of localization and classification of the wash items is possible. The analysis shows a sufficient recognition rate for practical use with an accuracy and hit rate above 90%.

Furthermore, the invention is based on the knowledge that it is advantageous in terms of accuracy and reproducibility when image acquisition is carried out within the treatment chamber 2 with the treatment chamber 2 closed.

In order to reduce or even avoid water vapor condensation on the optical detection systems 51 (cameras), a pre-wash of, for example, 1 second duration before the image is taken is advantageous. With this pre-wash, the water vapor condensation on the camera can be reduced or minimized to such an extent that it does not interfere with the image acquisition.

The invention is not limited to the exemplary embodiments of the dishwasher or the optical wash item recognition system shown in the drawings, but results from an overview of all the features disclosed herein.

The invention claimed is:

1. A method for operating a program automation dishwasher, with a treatment chamber that can be closed by a door or a hood and in which wash items can be treated according to a pre-selected or defined treatment program while the wash items remain in a stationary location in the treatment chamber, wherein the method comprises:

imaging and classifying the wash items to be treated with the help of an optical wash item recognition system that includes a lens located in the treatment chamber, wherein the classifying involves determining a shape and/or a material of the wash items; and treating the wash items in the treatment chamber of the dishwasher with treatment parameters that have been automatically selected depending on the classification of the wash items, wherein the treatment parameters relate to the following:
a time duration of a washing phase, a time duration of a final rinse phase, a time duration of a drying phase, a temperature of a washing liquid to be sprayed in the treatment chamber during the washing phase, a temperature of a final rinse liquid to be sprayed in the treatment chamber during the final rinse phase, a nozzle pressure of the washing liquid to be sprayed in the treatment chamber during the washing phase, a nozzle pressure of the final rinse liquid to be sprayed in the treatment chamber during the final rinse phase, a quantity of washing liquid to be sprayed in the treatment chamber per unit time during the washing phase and/or a quantity of the final rinse liquid to be sprayed in the treatment chamber per unit of time during the final rinse phase;

wherein, before the process of imaging and classifying:
the wash items are positioned in the treatment chamber of the dishwasher and the treatment chamber is closed, and a pre-wash of the wash items in the treatment chamber is carried out so that condensation of water vapor on the lens of the optical wash item recognition system is prevented or reduced.

2. The method according to claim 1, wherein the pre-wash lasts no longer than 10 seconds.

3. The method according to claim 2, wherein during the pre-wash a non-heated pre-wash liquid is sprayed in the treatment chamber.

4. The method according to claim 2, wherein the pre-wash lasts for between 0.5 seconds and 2 seconds.

* * * * *